United States Patent [19]
True, Jr.

[11] 4,072,374
[45] Feb. 7, 1978

[54] SIDE FASTENER CLIP FOR A PLATE-LIKE MEMBER

[75] Inventor: Howard D. F. True, Jr., Fern Creek, Ky.

[73] Assignee: General Electric Company, Louisville, Ky.

[21] Appl. No.: 726,827

[22] Filed: Sept. 27, 1976

[51] Int. Cl.² ............... A47B 96/06; A44B 21/00
[52] U.S. Cl. ........................ 312/214; 24/73 PF; 248/221.4
[58] Field of Search .................. 248/239, 221.4; 312/214, 236, 320; 24/73 P, 73 PP, 73 PF, 73 FT, 255 R, 255 GP

[56] References Cited
U.S. PATENT DOCUMENTS

| 2,896,897 | 7/1959 | Schlueter | 248/239 |
| 3,154,281 | 10/1964 | Frank | 248/221.4 |
| 3,471,112 | 10/1969 | MacDonald | 248/234 |
| 3,666,228 | 5/1972 | Arnold | 24/255 R |

Primary Examiner—Paul R. Gilliam
Assistant Examiner—Alex Grosz
Attorney, Agent, or Firm—Steven C. Schnedler; Francis H. Boos

[57] ABSTRACT

A fastener clip is adapted for removably mounting a plate-like member to a side wall, the plate-like member including a leading edge perpendicular to the side wall. The fastener clip comprises a base member adapted for secure mounting to the side wall and a pair of spaced resilient parallel legs projecting outwardly from the base member generally perpendicularly to the side wall. The gap between the parallel legs is generally parallel to the installed position of the plate-like member. A head is formed on the end of each leg, extending generally away from the gap. Each of the heads has at least a first inclined surface, with the first inclined surfaces oriented with respect to each other so as to form a generally "V" shaped channel for guiding the leading edge and bead of the plate-like member into the space between the parallel legs.

6 Claims, 5 Drawing Figures

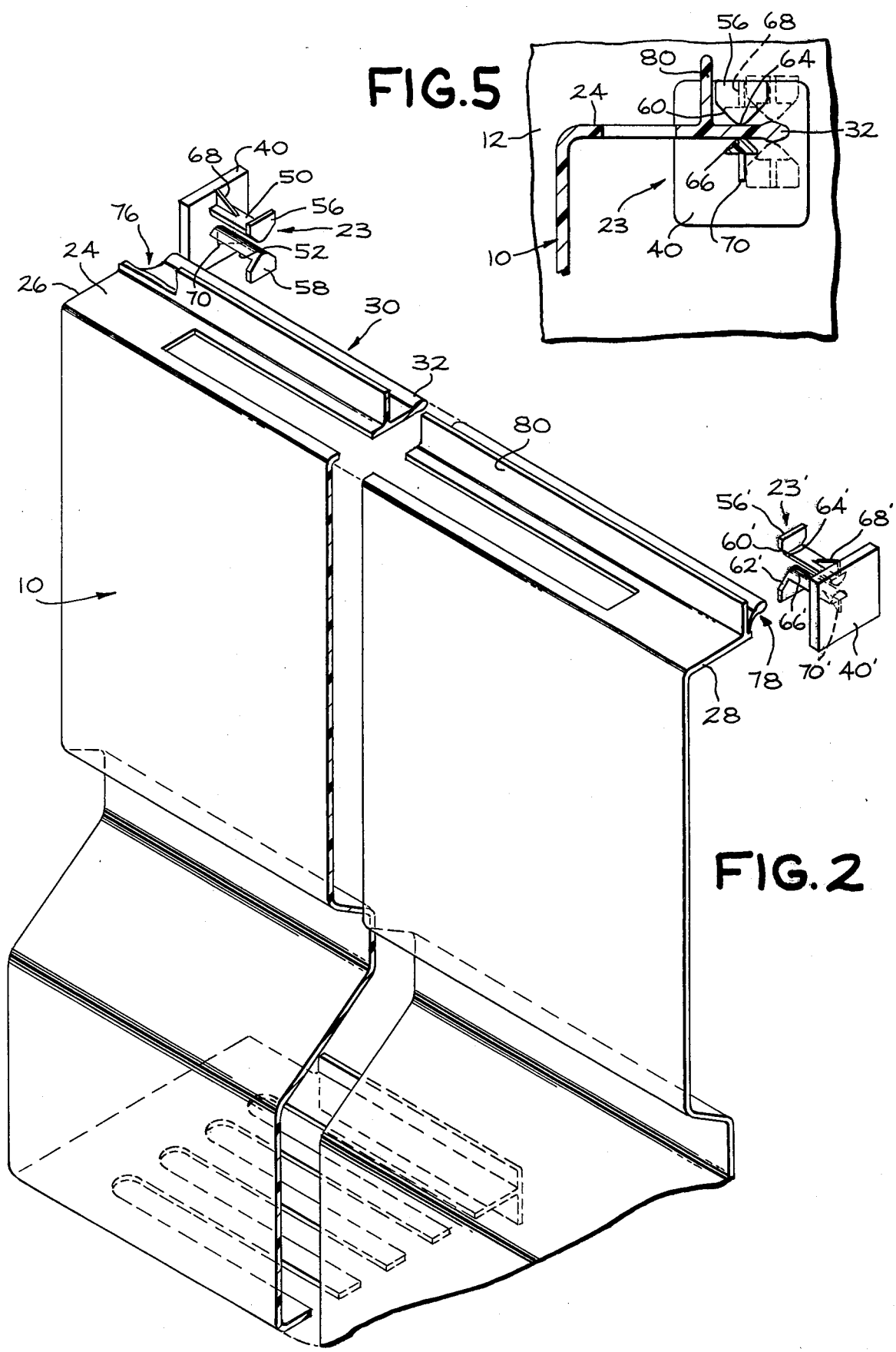

SIDE FASTENER CLIP FOR A PLATE-LIKE MEMBER

BACKGROUND OF THE INVENTION

1. Field Of The Invention

The present invention relates generally to a fastener clip and, more particularly, to a fastener clip useful for blind mounting to a side wall of a plate-like member having a beaded leading edge.

2. Description Of The Prior Art

In apparatus such as refrigerators, there are compartments in which housings are mounted. A housing may, for example, be a control housing for concealing the working parts of a control mechanism from the user. Another example is a housing associated with an air distribution system and designed to form an air duct between the inner surface of the housing and the rear wall of the compartment. Typically, the upper portion of such a housing comprises a plate-like member having left and right side edges which are generally adjacent the side walls of the compartment and having a leading edge perpendicular to the side edges and generally adjacent the rear wall of the compartment.

It is naturally essential that some means be included for mounting such a housing in place, particularly the plate-like member forming a part thereof. One approach is simply the use of screws. However, screws may take an unnecessarily long time for installation and, depending upon their location, can be unsightly.

By the present invention, there is provided a fastener clip for mounting a plate-like member to a side wall. The mounting may be a "blind mounting" whereby the clip is concealed when the plate-like member is in place to provide good appearance. Since the clip may not be visible to the installer, means are included for overcoming any slight misalignment to guide the plate-like member into a proper position during installation. Additionally, the plate-like member may be easily removed when desired.

SUMMARY OF THE INVENTION

Accordingly, it is an object of the invention to provide an improved fastener clip for securely mounting a plate-like member to a side wall.

It is another object of the invention to provide a fastener system which is adapted for blind mounting of the plate-like member to the clip.

These and other objects are accomplished by the present invention which is adapted for mounting a plate-like member to a side wall. The plate-like member for use with the fastener clip includes a side edge to be held generally adjacent the side wall and a leading edge perpendicular to the side edge, with the leading edge having a bead. Additionally, the plate-like member includes a means for preventing further movement beyond an installed position.

The fastener clip according to the invention comprises a base member adapted for secure mounting to the side wall and a pair of spaced resilient parallel legs projecting outwardly from the base member generally perpendicularly to the side wall, with the gap between the parallel legs generally parallel to the installed position of the leading edge of the plate-like member. The parallel legs are spaced sufficiently far to receive the thickness of the plate-like member and sufficiently close to require deforming of the parallel legs to permit passage of the bead on the leading edge of the plate-like member therebetween. Additionally, a head is formed on the end of each leg extending generally away from the gap. Each of the heads has at least a first inclined surface, with the first inclined surfaces oriented with respect to each other so as to form a generally "V" shaped channel for guiding the leading edge and bead of the plate-like member into the space between the parallel legs. The plate-like member is then installed by positioning the leading edge in generally parallel relationship with the legs and inserting the bead and leading edge through the gap between the legs.

In one form of the invention, the plate-like member includes a flange-like projection extending upwardly to conceal the fastener clip in the installed position.

DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 is an exploded perspective view showing a fragmented portion of the housing and clips according to the invention;

FIG. 5 is a greatly enlarged sectional view taken along line V—V of FIG. 1 illustrating the deforming of the parallel legs on the fastener clip as the leading edge bead is inserted therebetween.

DESCRIPTION OF THE PREFERRED EMBODIMENT

Figure 1:
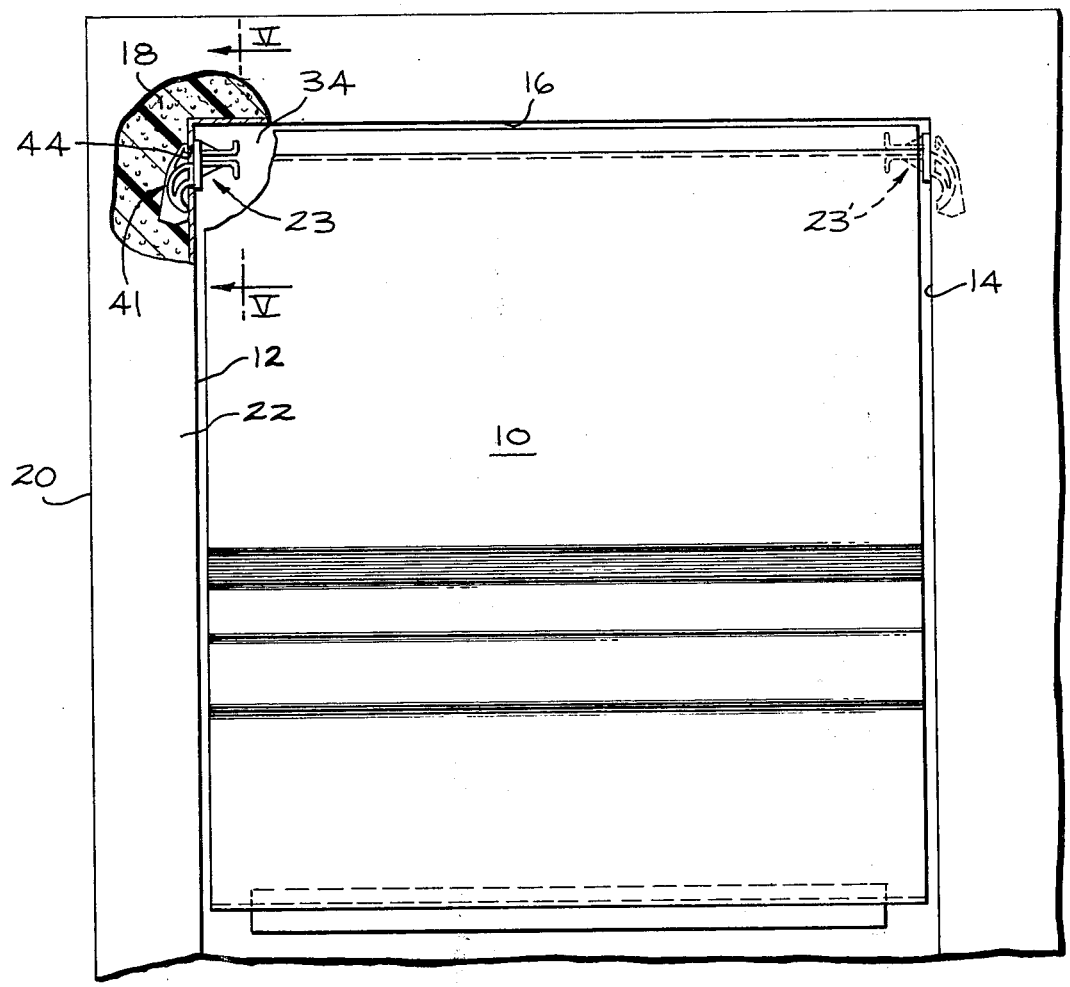
FIG. 1 is a front elevational view of a portion of the freezer compartment of a side-by-side refrigerator including a housing and fastener clips on either side according to the present invention.
Figures 3, 4:
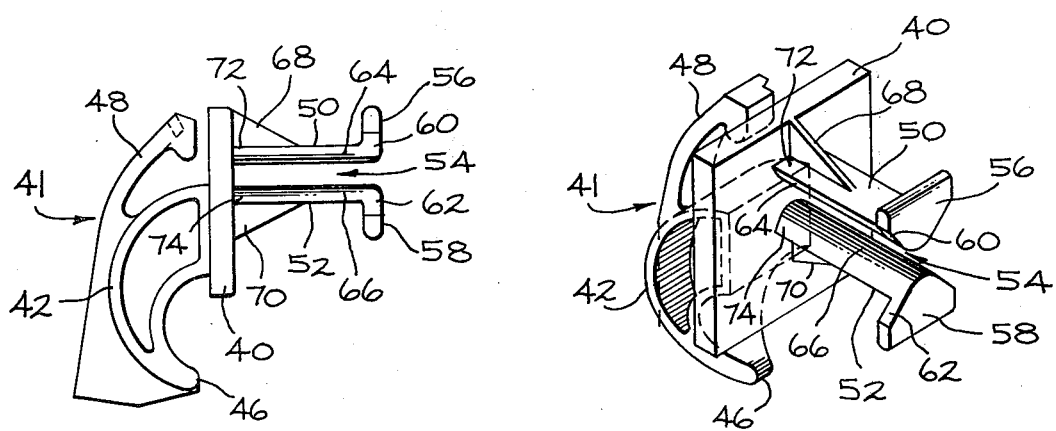
FIG. 3 is a perspective view of the clip taken generally from the front side thereof.
FIG. 4 is an enlarged side elevational view of the clip.

Referring first to FIGS. 1 and 2, there is shown a plastic air channel housing 10 mounted between left and right opposed side walls 12 and 14 (FIG. 1 only) which form a part of the freezer compartment of a side-by-side refrigerator. The freezer compartment also has a top wall 16 and thermal insulation material 18 filling the space between the inner liner and the outer case 20. A portion of the refrigerator front face 22 is broken away in the illustration to show the insulation material 18 and the rear portion of the clip 23, hereinafter described in detail.

The top portion of the housing 10 comprises a plate-like member 24 (FIG. 2) which, being a part of the housing 10, itself is adapted to be mounted between the left and right side walls 12 and 14. Specifically, the plate-like member 24 has a left side edge 26 adapted to be held generally adjacent the left side wall 12 and a right side edge 28 adapted to be held generally adjacent the right side wall 14. Additionally, the plate-like member 24 includes a leading edge 30 perpendicular to the side edges 26 to 28. A bead 32 is formed on the leading edge 30. The plate-like member 24 further includes means for preventing further forward movement beyond the installed position, which means may be the rear wall 34 of the freezer compartment inner liner as it is contacted by the beaded leading edge 30.

In order to hold the plate-like member 24 releasably in its installed position, the left and right fastener clips 23 and 23' constructed according to the present invention are provided. The clips 23 and 23' may be formed from any suitable plastic material using conventional techniques, such as injection molding. The description hereinafter primarily refers to the left side clip 23, but it will be understood to apply as well to the right side clip 23'.

Referring now, in addition to FIGS. 1 and 2, to FIGS. 3, 4, 5, the fastener clip 23 will be described in greater detail. The clip 23 has a base member 40 adapted for secure mounting to the left side wall 12. The clip 23 illustrated in FIGS. 1, 3 and 4 includes an exemplary fastener means 41 on the rear side of the base member 40 for securing the clip 23 to the side wall 16, the illustrated fastener means 41 forming no part of the present invention. This rear fastener configuration includes an arched or hook-like member 42 adapted for insertion through a suitable aperture 44 in the side wall 16, the arched member 42 including a tip 46 adapted for contacting a portion of the rear surface of the side wall 16. A resilient retaining arm 48 is adapted to deform to allow passage of the rear fastener means through the aperture 40 and, upon installation, to spring back to engage another portion of the side wall rear surface, thereby to hold the base member 40 securely in position. Additional details and a description of the operation of a rear fastener similar to that described above may be found by reference to U.S. Pat. No. 3,954,243— Sharp et al, which patent is hereby incorporated by reference.

It will be understood that the illustrated rear fastening means 41 is exemplary only, and that any suitable means for securing the base member 40 to the side wall 16 may be employed. It may be adhesively fastened. In view of the numerous rear fastening means possible, FIGS. 2 and 5 do not illustrate any particular means for rear fastening, although the flat rear portion of the base member 40 is suitable for adhesive fastening.

Considering now the portion of the clip 23 which the present invention comprehends, the clip 23 additionally includes a pair of spaced resilient parallel legs 50 and 52 projecting outwardly from the base member 40 generally perpendicularly to the base member 40 and to the side wall 16. A gap 54 is defined between the parallel legs 50 and 52 generally parallel to the installed position of the leading edge 30. The spacing between the parallel legs 50 and 52 is sufficient to receive the thickness of the plate-like member 24 (exclusive of the thickness of the bead 32) and sufficiently close to require deforming to permit passage of the leading edge bead 32.

Heads 56 and 58 are formed on the ends of the legs 50 and 52, extending generally away from the gap 54. The heads 56 and 58 have at least first inclined surfaces 60 and 62, with the surfaces 60 and 62 inclined with respect to each other so as to form a generally "V" shaped channel for guiding the leading edge 30 and bead 32 of the plate-like member 24 into the space or gap 54 between the parallel legs 50 and 52.

Preferably, the parallel legs 50 and 52 further include first facing inclined camming surfaces 64 and 66 extending along the lengths thereof. The camming surfaces 64 and 66 are continuations of the inclined surfaces 60 and 62 and are adapted to cooperate with the leading edge bead 32 to spread the legs 50 and 52 apart.

In order to achieve reversibility and interchangeability, the heads 56 and 58 and legs 50 and 52 are symmetrical and therefore further include corresponding second inclined surfaces 60' and 62' and second facing inclined camming surfaces 64' and 66', which surfaces are all visible on the right-hand clip 23' (FIG. 2). This permits a single clip to be tooled and used interchangeably for either left or right side applications. In either case, the unused set of surfaces assists somewhat in camming the legs 50 and 52 apart for removal of the plate-like member 24, although there is of course no need for guiding function which the inclined surfaces 60 and 62 perform upon installation.

For rigidity, reinforcing webs 68 and 70 extend from near the roots 72 and 74 of the parallel legs 50 and 52 to the base member 40 and along a portion of the parallel legs 50 and 52. The webs 68 and 70 are oriented so as to resist, but still permit, deformation of the legs 50 and 52.

Since the portion of the legs 50 and 52 near the roots 70 and 74 and the gap therebetween cannot readily be spread apart due to close proximity to the base member 40, as compared to the portion near the tips, the plate-like top member 24 must be so constructed that the leading edge bead 32 passes between the legs 50 and 52 only near the tip ends and not near the roots 70 and 74. In the illustrated embodiment, as seen best in FIG. 2, the leading edge 30 and bead 32 are cut away near the extreme corners of the plate-like member 24, the cutaway corners being designated 76 and 78.

In the preferred embodiment of the invention, the plate-like member 24 includes a flange-like projection 80 (best seen in FIGS. 2 and 5) which conceals the fastener clips 23 and 23', particularly the legs 50 and 52, when the housing 10 is installed.

In the operation of the present invention, after the clips 23 and 23' are secured to the side walls 12 and 14, the housing 10 and plate-like member 24 are manually positioned in a suitable position for installation. The installer then simply moves the plate-like member back towards the clips 36 and 38. Due to the inclined surfaces 60 and 62 on the heads 56 and 58, precise location of the leading edge 30 with respect to the fastener clips 36 and 38 is not required, as the inclined surfaces 60 and 62 tend to guide the leading edge 30 properly into position between the legs 50 and 52. As shown in broken lines in FIG. 5, movement of the leading edge 30 through the gap 54 causes spreading apart of the legs 50 and 52 due to cooperation between the leading edge bead 32, the inclined surfaces 60 and 62, the camming surfaces 64 and 66. After passage of the leading edge bead 32 between the legs 50 and 52, the legs return to their undeformed position (solid lines in FIG. 5), thereby resisting withdrawal of the plate-like member 24 from its installed position.

Removal of the plate-like member 24 is accomplished by merely manually pulling it out, thereby again deforming the legs 50 and 52 sufficiently to permit passage of the bead 32 therebetween.

It will be apparent therefore that the present invention provides a fastener clip and mounting apparatus well adapted for blind mounting of a housing comprising a plate-like member between two opposed side walls.

While specific embodiments of the invention have been illustrated and described herein, it is realized that numerous applications and changes will occur to those skilled in the art. It is therefore to be understood that the appended claims are intended to cover all such modifications and changes as fall within the true spirit and scope of the invention.

What is claimed is:

1. A fastener clip for mounting a plate-like member to a side wall, the plate-like member having a side edge to be held generally adjacent the side wall and a a beaded leading edge perpendicular to the side edge, the plate-like member also including means for preventing further forward movement beyond an installed position, said fastener clip comprising:

a base member adapted for secure mounting to the side wall;

a pair of spaced resilient parallel legs projecting outwardly from said base member generally perpendicularly to the side wall, the gap between said parallel legs being generally parallel to the installed position of the leading edge of the plate-like member;

said parallel legs being spaced sufficiently far to receive the thickness of the plate-like member and sufficiently close to require deforming of said parallel legs to permit passage of the bead on the leading edge of the plate-like member; and a head formed on the end of each leg and extending generally away from the gap between said legs, each of said heads having at least a first inclined surface with said first inclined surfaces oriented with respect to each other so as to form a generally "V" shaped channel for guiding the leading edge and bead of the plate-like member into the space between said parallel legs;

whereby the plate-like member is installed by positioning the leading edge in generally parallel relationship with said legs and inserting the bead and the leading edge through the gap between said legs.

2. The fastener clip of claim 1, further comprising a reinforcing web extending from near the roots of each of said parallel legs to said base member, said reinforcing web oriented so as to resist, but still permit, deformation of said legs as the bead on the leading edge of the plate-like member passes between said legs.

3. A fastener clip according to claim 1, wherein said parallel legs include facing inclined camming surfaces extending along the lengths thereof for cooperating with the bead on the leading edge of the plate-like member to spread said legs apart.

4. A fastener clip according to claim 3, wherein said facing inclined camming surfaces are continuations of said inclined surfaces on said heads.

5. Apparatus for mounting a housing between left and right opposed side walls, said apparatus comprising:

the housing having left and right side edges and a leading edge perpendicular to the side edges, the housing having a width between said side edges sufficient for loosely fitting between the opposed side walls;

a bead on the leading edge of the housing;

a pair of fastener clips attached to the left and right side walls for receiving and holding the leading edge of the housing, each of said fastener clips comprising a base member securely mounted to the side wall, a pair of spaced resilient parallel legs projecting outwardly from said base member generally perpendicularly to the side wall and parallel to the housing leading edge, said parallel legs being spaced sufficiently far to accommodate the thickness of the housing immediately behind the leading edge and sufficiently close to require deforming to pass said leading edge bead, and a head formed on the end of each leg, each of said heads having an inclined surface with said inclined surfaces oriented with respect to each other so as to form a "V" shaped channel for guiding the leading edge and bead into the space between said parallel legs; and means for preventing further forward movement of said housing through the space between said legs.

6. Apparatus according to claim 5, further comprising a flange-like projection extending from the housing to conceal said fastener clip when the housing is in its installed position.

* * * * *